United States Patent [19]
Hund et al.

[11] Patent Number: 5,700,109
[45] Date of Patent: Dec. 23, 1997

[54] TRAVELING MULTI-FUNCTIONAL DISPOSAL SIMULATION INSTALLATION

[75] Inventors: Kerstin Hund, Schmallenberg/Gleidorf; Werner Klein, Schmallenberg; Werner Kördel, Schmallenberg; Theo Görtz, Schmallenberg; Norbert Schwarzer, Lennestadt, all of Germany

[73] Assignee: Fraunhofer-Gesellschaft zur Forderung der Angewandten Forschung e.V., Munich, Germany

[21] Appl. No.: 620,569

[22] Filed: Mar. 22, 1996

[30] Foreign Application Priority Data

Mar. 24, 1995 [DE] Germany ............ 195 10 917.1

[51] Int. Cl.⁶ .................... B09C 1/02; B09C 1/06
[52] U.S. Cl. ............ 405/128; 71/901; 71/903; 405/303; 588/249; 588/900
[58] Field of Search ............. 405/128, 129, 405/130, 131, 303; 588/1, 249, 260, 261, 900; 47/DIG. 10; 71/901, 903; 435/262.5

[56] References Cited

U.S. PATENT DOCUMENTS

| | | | |
|---|---|---|---|
| 4,146,382 | 3/1979 | Willisch | 71/901 X |
| 4,545,540 | 10/1985 | Nakamura | 588/900 X |
| 4,606,283 | 8/1986 | DesOrmeaux et al. | 588/900 X |
| 4,655,916 | 4/1987 | Schlesiger | 405/128 X |
| 4,919,570 | 4/1990 | Payne | 405/128 |
| 4,925,571 | 5/1990 | Jacob et al. | 71/903 X |
| 4,934,283 | 6/1990 | Kydd | 588/900 X |
| 5,375,944 | 12/1994 | Kotani et al. | 405/129 |
| 5,591,117 | 1/1997 | Zelno | 588/249 X |

Primary Examiner—George A. Suchfield
Attorney, Agent, or Firm—Greenblum & Bernstein P.L.C.

[57] ABSTRACT

There is described a travelling multi-functional disposal simulation installation for simulating the long-term behaviour of materials for disposal containing organic components. These can comprise disposable house refuse and similar wastes, but also contaminated soils. Simulation serves for recultivation, composing and similar soil investigations. The installation constructed for this purpose comprises a double-walled heatable container, a lower, inner base plate with a slight inclination to the horizontal and with at least one outlet opening at its lowermost point, a horizontal base plate disposed immediately above the said first base plate, and forming the support base for the fill material, and which is in the form of a screen base, two different lid formations extending in a gas-tight manner over the clear width of the container and being vertically adjustable along the inner wall, and a travelling undercarriage receiving the entire container.

13 Claims, 2 Drawing Sheets

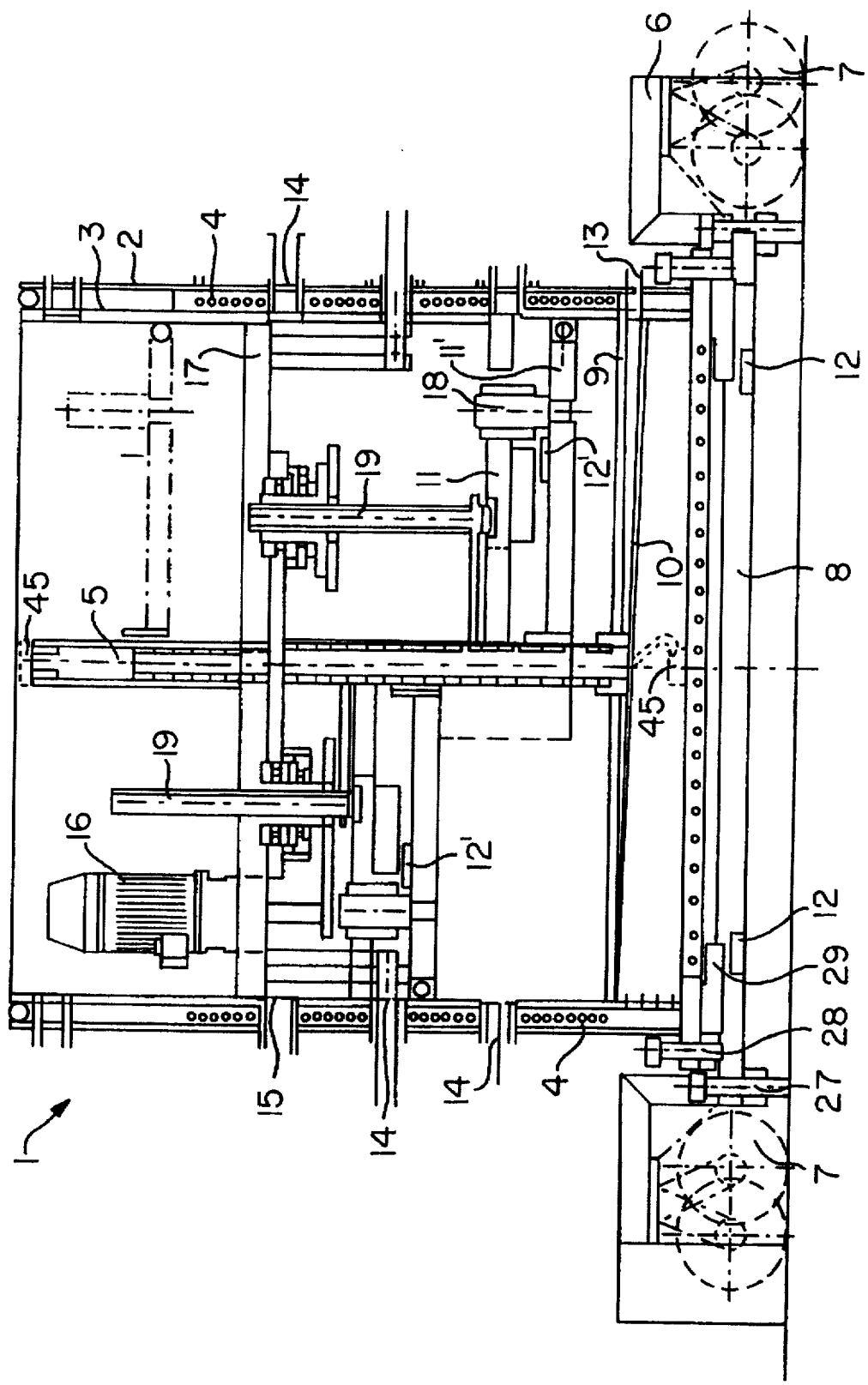

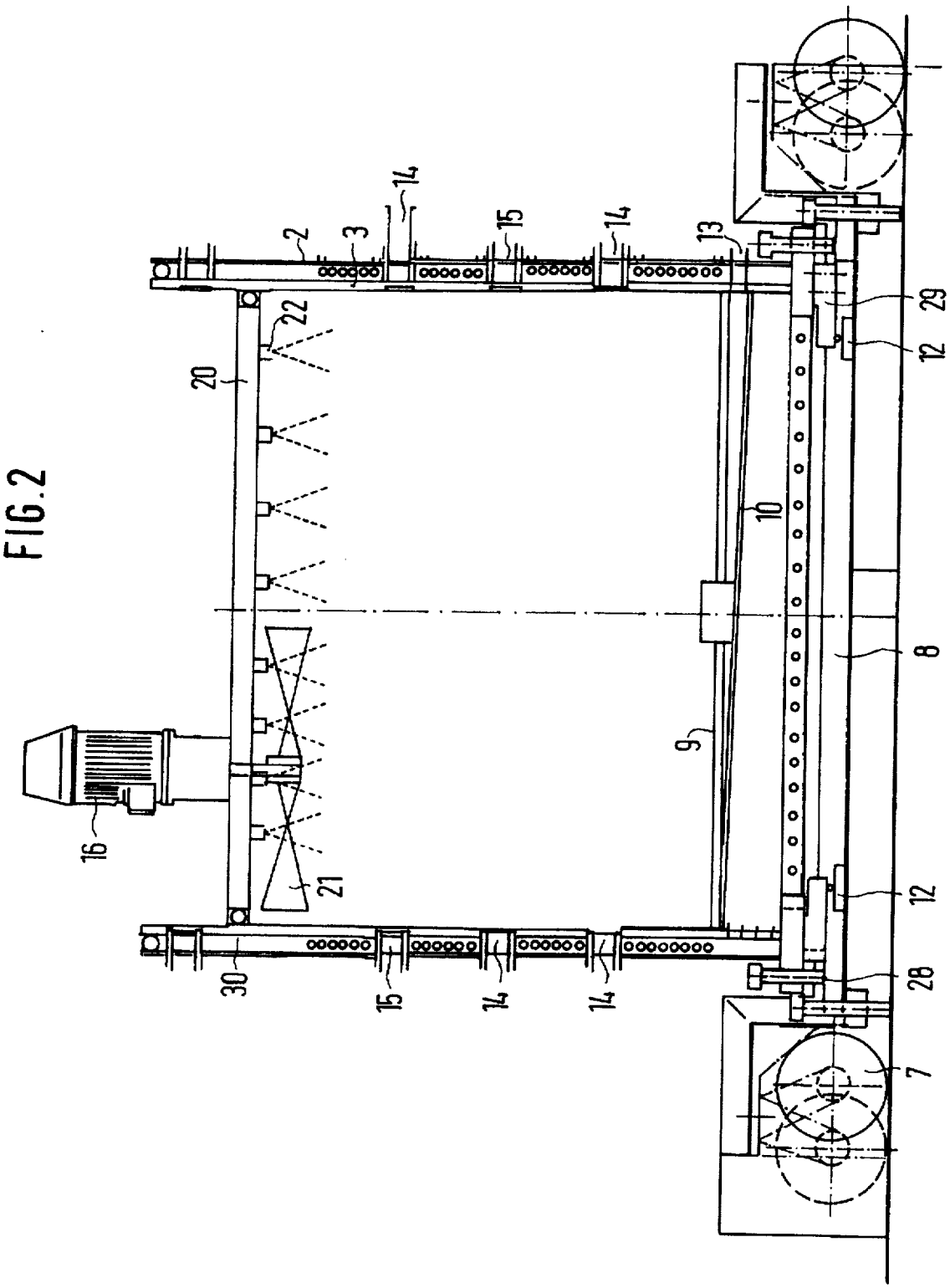

TRAVELING MULTI-FUNCTIONAL DISPOSAL SIMULATION INSTALLATION

CROSS REFERENCE TO RELATED APPLICATION

The present application claims the priority under 35 U.S.C. § 119 of German Patent Application No. 195 10 917.1 filed Mar. 24, 1995.

BACKGROUND OF THE INVENTION

1. Discussion of Background Information

The invention relates to a travelling multi-functional disposal simulation installation for simulating the long-term behaviour of materials for disposal containing organic components.

DISCUSSION OF BACKGROUND INFORMATION

The increasing environmental stress caused by constantly increasing amounts of waste involved in the mass-produced products on the market in our industrial society, but in addition the considerable increase in soil contamination due to the often heedless use of herbicides and pesticides in agriculture, and finally also the increased risk of contamination of even large areas of land by reason of carelessness or accidental damage, for example in the large-scale chemical industry and reactor technology, have led to a raised consciousness among the population and the responsible bodies in politics and industry, in the direction of responsible action when dealing with nature and the rest of the environment.

Growing deposits of waste with waste disposal capacities which are scarcely sufficient any longer, contrast with resources of raw materials which are becoming scarcer; this divergent development can only be stopped if the recyclable components in goods for disposal can be won back and returned to use in a logical form of circulation. In particular, waste, such as domestic refuse, garden refuse, community sludge, but also wastes from the industries processing agricultural products, are advantageous and suitable for biological recycling, whether by composting or by other biological decomposition processes, in which harmful substances are to the largest extent removed, and a humus material rich in trace elements can be obtained.

In order in this respect to arrive at reasonable results which take account of the justified demands of environmental protection, it is necessary to have precise knowledge of decomposition processes, of the composting behaviour of various bioproducts, of the chemistry of aerobic and anaerobic short- or long-term decomposition, and of the risks of new formations of other toxic components during the degradation of toxic molecular compounds. Only in this way can a logical procedure in the processing of such waste materials be made possible which does not conceal within itself any new or extended risks.

A special and no less important problem is posed by the long-term behaviour of already-existing waste deposits, and those still to be developed, in particular the ensuing risk to ground water. If in future waste can only be deposited when it has first been rendered inert and mineralised by thermal treatment, the biomechanical treatment of correspondingly degradable Organic wastes gains further importance.

As it is not practicable to experiment over decades in the search for a solution to the above-described urgent problems, for example the long-term behaviour of previous waste-disposal deposits, in order to have exploitable results, which are not available until a next generation, it is necessary to carry out research with models which are as realistic as possible, and which are capable of simulating the behaviour of large volumes of material, even if these occur over relatively long periods of time, with regard to the parameters to be investigated, on a laboratory scale and over relatively short periods of time.

In this connection, for example, lysimeters are known, in which sample volumes from only a few $cm^3$ up to a few $m^3$ are investigated for possible redevelopment, in the case for example of chemically-contaminated soils, or the recultivation behaviour of barren contaminated soil is tested with various given conditions of temperature, moisture, pressure and the like. Also pursued with such lysimeters, particularly with large-volume lysimeters, is also the deposition behaviour of wastes; here however the problem arises that extensions to knowledge based on extremely varied test variables often can only be carried out in small-volume lysimeters for reasons of cost, particularly when test results can only be evaluated statistically. However, the smaller the mass and volume of the sample material, the more remote are the given test conditions from the actual circumstances existing in nature or in the environment.

Lysimeters are poorly adapted to investigating the behaviour during decomposition of harmful substances in contaminated soils. Successful experiments have previously been conducted in this field with so-called bioreactors which my be used under suspension conditions. In the known bioreactors the temperature, oxygen content and nutrient content of the samples may be controlled in an appropriate way, depending on the testing cycle.

Again, further reactors are the main component of a further simulation process for research into composting behaviour of raw waste materials suitable for this purpose.

A disadvantage in the given simulation processes of the abovenamed type is that, depending on the objective aimed at and on the application envisaged, a plurality of different reactor installations or test structures is necessary, i.e. a correspondingly cost-intensive multiple technical outlay must be accepted in order to grasp the complexity of the possible solutions for the given environmental problems, and in order to be able to place them in the correct relationships.

A brief reference will be made here, by way of example, to the fact that it is not possible, or only in part and with great difficulty, in the case of simulation research with lysimeters, to collect and analyse the gases occurring during biodegradation. On the other hand, no information can be obtained on the settling behaviour of the deposited material inside the disposal site, as a function of time, with the previously-known deposit simulators.

SUMMARY OF THE INVENTION

The invention enters at this point, having the underlying object of proposing a disposal simulation installation of the type already named, by means of which a plurality of functions can be carried out optionally either simultaneously or consecutively, such as were fulfilled individually by the previous lysimeters, bioreactors or the like, so that the previously cost-intensive individual installations for differing purposes can be combined into a single installation, while at the same time improving the achievable test results.

The fulfilment of this object is achieved by providing a traveling multi-functional disposal simulation installation for simulating the long-term behavior of materials for disposal, e.g., disposable household rubbish and similar waste, which may include organic compounds, and of contaminated soils, their recultivation, composts and other similar soil tests. The installation includes a double walled heatable container having a lower base plate with a slight inclination to horizontal, and at least one outlet opening at a lowest point, a horizontal base plate, positioned immediately above the lower base plate, forming a support base, or screen base, for the fill material, with a lid extending in a gas-tight manner over a width of the container that is vertically adjustable along an inner wall of the container. The installation may also include a traveling undercarriage that receives the entire container. Advantageous embodiments and further developments of this solution may be seen in the present disclosure and the accompanying figures.

It is now possible, by means of the multi-functional disposal simulation installation designed in accordance with the invention, to carry out in one and the same installation a plurality of different functions such for example as the simulation of redevelopment processes, cultivation processes, the disposal behaviour of refuse, and also its long-term behaviour, the procedures in composting installations as well as all other types of soil testing. Statements as to the quality of soils, composts and wastes may thus be more reliably made. The long-term behaviour of compacted harmful substances in soils and composts may be investigated in terms of decomposition processes which take place slowly in nature so to speak on a time-lapse scale, leading to the development of new quality criteria for biomechanically treated residual refuse as regards its deposition behaviour or capacity for composting. By means of an advantageous combination of chemical and ecotoxicological analytic methods, extensive statements can be arrived at on the environmental behaviour of stored harmful substances, enabling future risks which were previously scarcely avoidable to be recognised earlier, and thus avoided.

By means of the built-in weighing devices, conclusions can be made on the behaviour in water of the fill material without disturbing the fill material itself. Disturbances previously caused in such investigations by the previously incorporated suction cartridges are entirely eliminated. Information regarding the settling behaviour of the fill material in disposal simulations can be considerably improved, as by means of the disposal simulation container according to the invention, automatic control both of a predeterminable temperature program of the temperature occurring in the simulation container itself, and of a temperature which may be supplied from the exterior, or removed, is possible. By means of continuous automatic gas analysis, statements can be made both on microbial activity and on the gas emission of harmful substances, in dependence on time and temperature. By virtue of the fact that the installation is made entirely of stainless steel, special investigations of radioactively contaminated samples may be carried out. Previously constructed apparatus as represented by the known lysimeter on the one hand and by the bioreactors on the other hand, are now replaced by simple interchange of two different lid constructions. The mobility of the disposal simulation installation can be said to involve the further advantage of mobility between different laboratory premises without dismantling and re-assembly of the entire installation.

Further advantages and details will be explained in more detail in the following with reference to the annexed drawings which illustrate by way of example embodiments of the installation.

BRIEF DESCRIPTION OF THE DRAWING FIGURES

FIG. 1: a disposal simulation installation according to the invention in its set-up for disposal simulation, in simplified cross-section, and FIG. 2: an installation according to the present invention, converted for the range of purposes of composting and cultivation of soils.

DETAILED DESCRIPTION OF THE PREFERRED EMBODIMENT

As shown schematically in the drawings, a stainless steel container 1 is mounted on a roller carriage 6, which may travel on rollers 7. The rectangular roller carriage 6 is of a substantially flat construction, so that its central portion 8 is situated low down, i.e. the support surface lies below the diameter of the rollers, in this case level with the axles of the rollers, the edge areas of the carriage chassis being angled upward in the way visible in the drawing, in order that they can freely accommodate the rollers 7 underneath them. The travelling undercarriage may be secured in a stationary fashion by means of stop screws 27, and if desired the entire load of the disposal simulation installation may be transferred from the rollers 7 on to just these stop screws. The stainless steel container 1 is mounted on the central, low-lying portion 8 of the travelling undercarriage, designed as a roller carriage 6, and may be secured in this position by means of locking bolts 28. The lower, supporting portions of the stainless steel container 1, which are in the form of a container bearing surface 29, are thus supported on load cells 12, which enable the weight of the container at any time to be determined or monitored. The stainless steel container mounted on the roller carriage 6 is cylindrical in shape, its cylindrical periphery being double-walled, comprising the outer wall 2 and the inner wall 3. The annular space formed between the double walls 2, 3 is filled with a flow medium of preferably high heat capacity, for instance with brine, so that from this point it is possible optionally to heat or to cool the material filling the container. In order to be able to control the external application of temperature to the fill material through the container wall in a time-dependent and programmable fashion, it is possible to introduce heating/cooling apparatus 4 into the annular space between outer wall 2 and inner wall 3, thus enabling direct control of the temperature at any moment of the cooling/heating medium. A further advantageous solution however consists in that the flow medium in the annular space is allowed to remain static after filling is completed, however causing it to circulate, continuously or intermittently, over an external heating/cooling apparatus, thus defining the temperature desired at any moment. In this way it is possible to run automatic temperature program in a temperature range between—10° C. and 80° C., appropriate to the simulation , in a fully-automated fashion. Passing through the double wall 2, 3 of the stainless steel container 1 are sampling openings 14 and openings 15 for measurement probes, these openings being provided at various heights about the peripheral surface of the container, and being openable and closable before and after being used.

In the base area a welded-in or otherwise attached screen base 9, measuring 1.5 m in the embodiment, traverses the cross-section of the container; the fill material inserted into the container rests upon this screen base. Closely beneath the screen base 9 is an internal base plate 10, sealing the underside of the container off closely, and which is slightly inclined to the horizontal and has on its lowermost end lying radially outwards an outlet opening 13, which is passed through the double wall 2, 3. The outlet opening 13 is connected to a collector device for seepage water (not shown) for purposes of taking samples and sample analysis.

In this embodiment, the disposal simulation installation 1 represents a disposal simulator, for which reason it is closed off at the top by a pressure lid 11, 11' which, extending over the clear width of the container, totally closes it off in a gas-tight manner, and is displaceable vertically along the inner wall 3. For this purpose its radially outer peripheral surface, which is in close engagement with the inner wall of the container 1, is provided with an appropriate gas-tight guidance means 30. In the embodiment, the container is approximately 1.40 meters high. For the purpose indicated in FIG. 1, a perforated riser pipe 5 is disposed centrally, lying in the vertical axis of the cylinder, on or in the base plate of the container, the perforations in said riser pipe being uniformly distributed over its entire length. The perforated riser pipe 5 serves to deflect and remove the gaseous components given off by the fill material in the container, a continuously-executed gas analysis providing valuable information both on the microbial activity and on emissions from harmful substances. Appropriate gas-measurement devices 45 may be mounted both directly on the riser pipe 5 and, via a hose connection, externally, preferably on the roller carriage 6 and forming an integral unit therewith.

The pressure lid 11, 11' comprises an upper steel plate 11 and a lower steel plate 11', which are held together via buffering spacers 18, and between which weighing devices in the form of load cells 12' are brought into position. Thus differences in the pressure charge on the upper steel plate 11 of the pressure lid on the one hand and from the fill material on the lower pressure plate 11' on the other hand may be measured, and variably adjusted depending on the structure of the test applied.

In the illustration of FIG. 1 the pressure lid 11, 11' is shown in two different positions on the left-hand and right-hand sides of the container 1, in order better to display the gradual filling of the stainless steel container 1. For the embodiment there results here an infinitely-variable fill height of approximately 110 cm, and thus a maximum fill capacity of approximately 1.8 m$^3$. This maximum volume of 1.8 m$^3$ was provided in this case in order to enable investigation even of inhomogeneous materials such for example as are represented by soils used in agriculture.

By means of the load cells 12, precise statements can be made on weight changes, for example upon increase in moisture, but also in drying procedures; these statements can be evaluated in relation to other parameters. By virtue of the fact that the pressure lid 11, 11 ' closes the container in a gas-tight manner from the exterior, investigation of the fill material under both aerobic and anaerobic conditions is possible. The gas analyser devices connectable to the riser pipe 5 can vary, so that $CO_2$, $CH_4$, $N_2O$, $N_2$, $NH_3$ and also $H_2S$ or other gas components, which may occur or may be expected in the simulated test arrangement, can be measured. When investigating contaminated disposal materials or soils, thus dependencies of the emission from harmful substances on storage time, storage pressure and temperature can be monitored.

For the range of applications under disposal according to FIG. 1, in which the double-walled pressure lid 11, 11' is used, there is also secured in the interior of the container, in the way shown, a motor plate 17, through which are passed spindles 19, drive propulsion for which is derived from a motor 16 mounted on the motor plane 17. Thus any optional degree of pressure my be set between motor plate 17 and pressure lid 11, the container 1 being gradually filled in stages with material for disposal under conditions corresponding to those actually obtaining in a refuse dump. For this purpose predetermined quantities of material for disposal are respectively filled in succession into the container, the pressure lid being actuated via the drive system 16 after each individual quantity of material is added, a specific pressure being thus exerted on each load of material. Any other special filling procedures of the stainless steel container 1 are imaginable, depending on the conditions, and are possible without conversion of the disposal simulation installation. The microbial decomposition processes taking place in large-scale refuse dumps, i.e. more or less intensive microbial activities, may thus be more effectively measured in dependence on the compaction, temperature and moisture conditions, and may be evaluated in accordance with various criteria. Such phenomena as various redox alterations in the long-term behaviour of the stored disposal material, alterations in pH value, defects in dump sealing and more of the like may be simulated, the solid components, seepage water components, and gas analysis providing a plurality of series of informative measurement values.

Due to the large number of possible variations, a further variety of uses are possible in simulating special dumps, redevelopment processes and the like.

FIG. 2 shows a further preferred possible application from a plurality of possible applications of the disposal simulation installation according to the invention. In this case the simulation of environmental conditions is undertaken at normal pressure. The pressure lid 11, 11', important for simulating disposal sines, with load cells provided between the arrangement of double steel plates, can be omitted here and be replaced by a simplified lid 20, for example also the motor plate 17 of FIG. 1, which is vertically adjustable within the container 1 in accordance with the pressure lid of FIG. 1, and for this purpose abuts against the inner peripheral surface of the inner wall 3 of the double wall 2, 3, with a gas-tight guidance means 30.

In contrast to the refuse site simulation in which the pressure lid is also in direct contact with the material being tested during the latter's incubation phase, in the simulation of environmental conditions an air space is left free above the test material, i.e. the lid 20 does not abut directly on the fill material in the container 1. For the test conditions of interest here and for this embodiment, there are provided, on the surface of the lid 20 facing the inner side of the container 1, for the behaviour, such as the composting and cultivation of soils, a plurality of overhead irrigation devices 22 in the form of nozzles regularly distributed over the lid surface, and at least one blower fan 21 for homogenising the atmosphere forming above the fill material.

The container 1 itself need undergo no changes from the form shown in FIG. 1. Here also openings for sample removal and the insertion of probes are symmetrically distributed over the side wall; these may be used in a way identical to that in the simulation of refuse sites in the embodiment in FIG. 1. In this embodiment, the motor 16 can serve to drive the fans 21, and also, via a spindle raising and lowering arrangement, can control the vertical movement of the lid. A plurality of connections passed through the lid can lead, with gas feed or return connections, to the most varied of measurement apparatus. Apertures not required for certain test arrangements are closed during anaerobic tests, or serve during the simulation of aerobic conditions to introduce atmospheric oxygen. Here also it is possible to carry out an external and fully-automatic temperature regulation via the heat-exchange medium in the annular space between outer wall 2 and inner wall 3 so that, for example, a simulation of seasonal cycles, of day/night temperature differentials and more of the like are possible. During a simulated composting process, for example, harmful substances can be injected into the humus fraction. External heating of the fill material arises as a necessity during composting simulation, for example due to the fact that in composting under natural conditions temperatures of 55° C. to 65° C. are reached in the material, and these cannot form in the container during the simulation on the smaller volume scale due to the unfavourable volume-surface ratios. Automatic extra heating in dependence on the temperature of the fill material provides a compensating factor here, and thus realistic conditions even for small tested quantities.

The design of the double-walled container 1 as a steel container also permits series of tests with radioactively contaminated test materials, or the use of radioactively marked contaminants, giving rise finally to total clarification of the behaviour of specific substances during composting in a subsequent environmental simulation. In the embodiment according to FIG. 2 the installation offers the opportunity of storing soil compost mixtures or soils, and of simulating in a manner almost true to nature various circulatory scenarios which may be imagined within the scope of (re-) cultivation, with the exception of plant growth. In order to investigate the long-term behaviour of compacted harmful substances on a time-lapse scale, the microbial decay performance is simulated, both by appropriate increase in temperature and by the provision of specific points of attack, such as can arise in nature, even if in a different chronological sequence.

What is claimed is:

1. A movable multi-functional waste disposal simulation installation for simulating long-term behavior of disposable materials including organic components such as household rubbish, of contaminated soil and its recultivation, and of compost, said installation comprising:

a container including an inner and outer wall;

an internal base plate fixedly mounted within said container;

a horizontal base plate positioned above said internal base plate to form a support for a fill material, said horizontal base plate including a screen member, said internal base plate being positioned at a slight angle relative to said horizontal base plate;

at least one opening in said container for communicating with said internal base plate at a lowest point;

a lid extending in a gas-tight manner over an internal area formed by said inner wall and vertically positionable relative to said horizontal base plate;

a travelling undercarriage for receiving said container; and weighing devices positioned between said undercarriage and said container.

2. The installation according to claim 1, said container further including a stainless steel cylindrical shape, an annular space formed between said inner and outer wall, and a plurality of apertures coupling said inner and outer wall; and said installation further comprising sample removing means and measuring probe positioning means coupled to said plurality of apertures.

3. The installation according to claim 2, said container further including a flow medium circulating within said annular space thermally influenced by an external temperature control.

4. The installation according to claim 1, further comprising a temperature control device positioned within an annular space formed between said inner and outer wall, said annular space being filled with a flow medium with a high heat capacity.

5. The installation according to claim 4, said flow medium comprising a brine solution.

6. The installation according to claim 1, said lid comprising a pressure lid arrangement with two parallel steel plates, and said pressure lid arrangement being vertically positionable relative to said horizontal base plate by spindle drive means.

7. The installation according to claim 6, a distance between said two parallel steel plates is maintained by additional weighing devices.

8. The installation according to claim 7, said weighing devices and said additional weighing devices comprising load cells.

9. The installation according to claim 1, said lid comprising a plate with an internal and external surface; and said installation further comprising:

at least one overhead irrigation device;

at least one blower fan;

a plurality of ports for gas removal and gas introduction; and wherein said at least one overhead irrigation device and said at least one blower fan are mounted to said internal surface and said plurality of ports extending from said internal surface to said external surface.

10. The installation according to claim 1, further comprising a perforated riser pipe centrally attached to said horizontal base plate and concentrically projecting upward with a cylindrical axis of said container and penetrating said lid in a gas tight manner.

11. The installation according to claim 1, further comprising an automatic temperature control device and a gas analysis apparatus.

12. The installation according to claim 1, said travelling undercarriage comprising a square roller carriage with a recess formed to receive at least an outer periphery of said container.

13. The installation according to claim 1, further comprising:

a plurality of spindles for imparting vertical displacement of said lid relative to said horizontal base plate;

a motor plate fixedly secured within said container; and a motor mounted on said motor plate for driving said plurality of spindles.

* * * * *